United States Patent
Chang

(10) Patent No.: US 10,216,970 B1
(45) Date of Patent: Feb. 26, 2019

(54) PROGRAMMABLE CONTROL SYSTEM OF OPTICAL READING DEVICE

(71) Applicant: Jen-Chi Chang, Taipei (TW)

(72) Inventor: Jen-Chi Chang, Taipei (TW)

( * ) Notice: Subject to any disclaimer, the term of this patent is extended or adjusted under 35 U.S.C. 154(b) by 0 days.

(21) Appl. No.: 15/961,844

(22) Filed: Apr. 24, 2018

(51) Int. Cl.
　　*G06K 7/10*　　　(2006.01)
　　*G06K 7/14*　　　(2006.01)
　　*G05B 19/042*　　(2006.01)

(52) U.S. Cl.
　　CPC ....... *G06K 7/1439* (2013.01); *G05B 19/0426* (2013.01)

(58) Field of Classification Search
　　CPC ........... G06K 7/10386; G06K 7/10544; G06K 7/10881; G06K 7/1439; G05B 19/0426
　　USPC .................................................. 235/375, 454
　　See application file for complete search history.

(56) References Cited

U.S. PATENT DOCUMENTS

| | | | | |
|---|---|---|---|---|
| 2005/0077359 A1* | 4/2005 | Boehm | ............... | G06K 7/10544 235/454 |
| 2010/0277330 A1* | 11/2010 | Gentilini | ............ | G06K 7/10881 340/679 |
| 2013/0015237 A1* | 1/2013 | Muehlmann | ....... | H04N 5/23225 235/375 |
| 2013/0015725 A1* | 1/2013 | Trammell | ............ | H02K 41/031 310/12.26 |
| 2015/0375130 A1* | 12/2015 | Cannon | .................. | A63H 30/04 446/454 |
| 2017/0323575 A1* | 11/2017 | Klante | ............... | G06K 7/10386 |

* cited by examiner

*Primary Examiner* — Daniel A Hess
(74) *Attorney, Agent, or Firm* — Leong C. Lei

(57) ABSTRACT

A programmable control system of an optical reading device, comprising: an instruction printed matter which prints at least one instruction pattern with the corresponding encoded data; an optical reading device used to read the encoded data; and a programming processing device which is coupled with the optical reading device and has a program code database unit saving a plurality of program codes corresponded to the encoded data; and the programming processing device reads at least one encoded data via the optical reading device and stores it into a main program register unit or a function register unit; wherein the programming processing device combines the sequenced program codes in the main program register unit and the function register unit into a program code sequence to transmit to a programmable control equipment to proceed the manipulation after the optical reading device reads a startup instruction.

5 Claims, 6 Drawing Sheets

1) Begin Robot( )
2)
3) Move Forward 1
4) Move Forward 1
5) Call Function( )
6) Turn Left
7) Move Forward 1
8) Move Forward 1
9) Call Function( )
10) Turn Right
11) Move Forward 1
12) Move Forward 1
13) Red Light On
14)
15) End Robot( )
16)
17) Function Start( )
18) Beep
19) Beep
20) Function End( )

FIG.6

PROGRAMMABLE CONTROL SYSTEM OF OPTICAL READING DEVICE

(a) TECHNICAL FIELD OF THE INVENTION

The present invention relates to a programmable control system of an optical reading device, and especially relates to a programmable control system which can apply the optical reading device to read at least one encoded data of an instruction printed matter to edit and sort the program codes and control the processing system of the peripheral equipment.

(b) DESCRIPTION OF THE PRIOR ART

Along with the advancements in technology, users can perform the learning aids through the learning machines with the optical reading devices such as the point reading pens, color recognition devices, and the like.

By using an optical reading device to click on a picture or text to be learned in a printed matter, such as a book, the coded data on the clicked position can be read, and the optical reading device or the learning machine can then use the coded data to display the multimedia content such as the pronunciation, picture, audio and video of the specific words.

However, in the era of the Internet of Things (IoT) and the Artificial Intelligence (AI), any IoT or AI device can use programs to manipulate or exchange data; for example, the smart cars, robots, etc.; but the related processing systems using the existing optical reading devices cannot control and communicate with these devices.

SUMMARY OF THE INVENTION

The main object of the present invention is to provide a programmable control system of an optical reading device, which comprises: an instruction printed matter which has at least one instruction pattern thereon, wherein a corresponding encoded data is printed on the instruction pattern; an optical reading device used to read the encoded data on the instruction pattern; and a programming processing device which is coupled with the optical reading device and has a program code database unit saving a plurality of program codes; wherein each program code is or multiple program codes are corresponded to an encoded data on the instruction pattern; and the programming processing device reads at least one encoded data of the instruction pattern via the optical reading device and stores the program code content corresponding to the encoded data in the reading order into a main program register unit or a function register unit; wherein the programming processing device will combine the sequenced program codes in the main program register unit and the function register unit into a program code sequence after the optical reading device has read an instruction of startup, and the program code sequence will be transmitted to a programmable control equipment through a program code output unit to proceed the manipulation.

Preferably, the instruction printed matter prints a pattern of one instruction or the patterns of more instructions in a pattern way on at least one printed matter, wherein each instruction pattern has a corresponding encoded data; and the instruction pattern comprises a general instruction or a system instruction; wherein the general instruction can control the equipment actions, such as moving forwards one step, turning left, turning right, the red light is on, etc.; and the system instruction executes the system-related settings such as "function start", "function end", "reset", "begin to startup", and so on.

Preferably, after the optical reading device reads the encoded data on the instruction pattern of the instruction printed matter, the wired or wireless connection can be used to transmit the encoded data to the programming processing device to process; wherein the wireless connection may include the wireless radio communication, RF radio, Bluetooth, Wifi, Wimax, UWB, etc.

Preferably, after the programming processing device receives the instruction encoded data sent from the optical reading device, the processing unit will store the program code in the program code database corresponding to the encoded data into the main program register unit or the function register unit according to the current working area if it belongs to a general instruction; and the processing unit will do the system-related setting or processing if it belongs to a system instruction.

Preferably, the program code database has stored the program code corresponding to each encoded data. For example, the program code for moving forwards one step is "Move Forward 1", the program code for turning left is "Turn Left", the program code for turning right is "Turn Right", etc.

BRIEF DESCRIPTION OF THE DRAWINGS

FIG. 6 is a sample of the program code sequence according to one embodiment of the present invention.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

Figure 1:
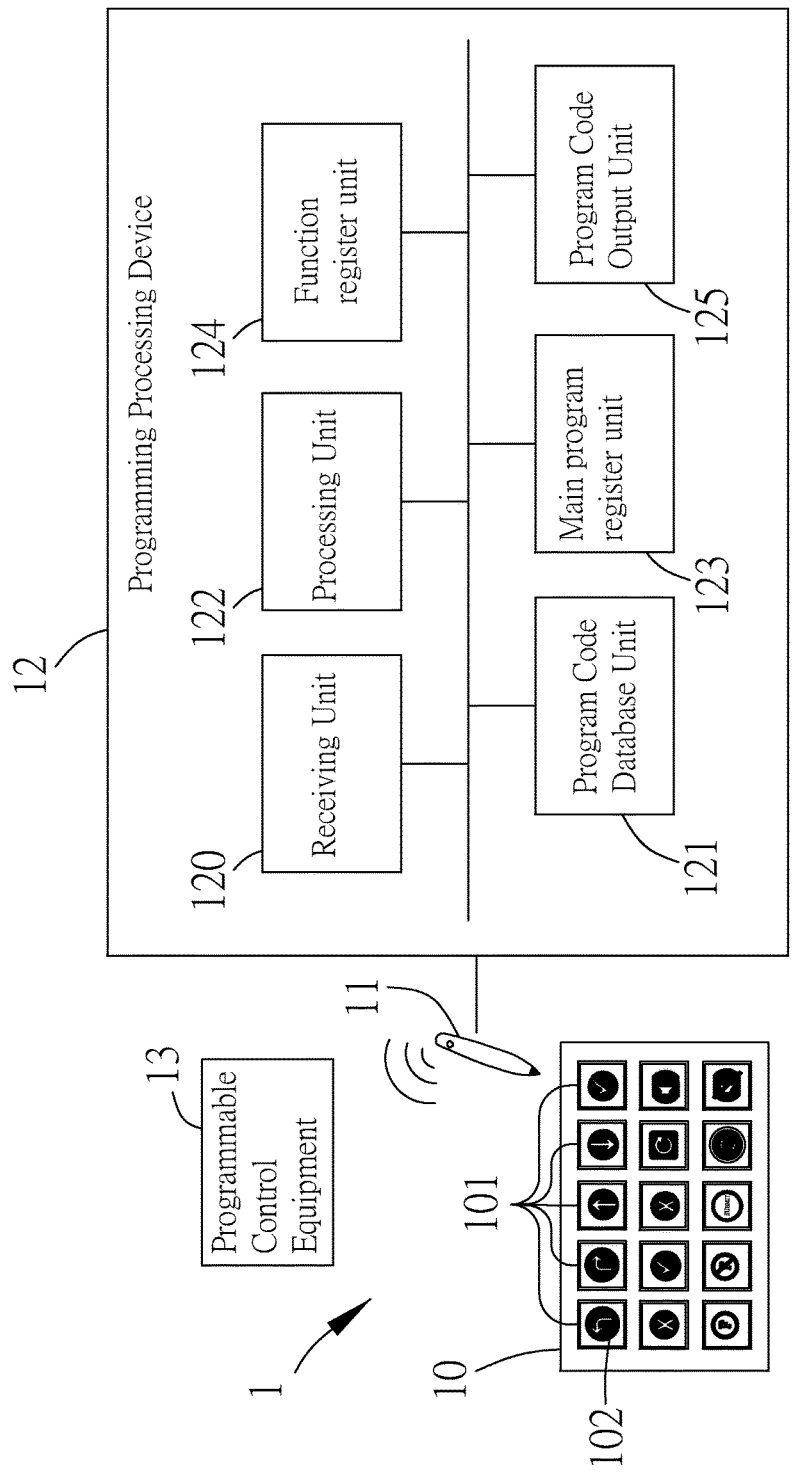
FIG. 1 is a schematic diagram of the programmable control system of an optical reading device according to one embodiment of the present invention.

Please refer to FIG. 1, the present invention provides a programmable control system 1 applying an optical reading device, which comprises: an instruction printed matter 10, which can be any material or article on which the encoded data can be printed; such as the paper, plastic, or various commodities and their packages, etc.; wherein the instruction printed matter 10 has at least one instruction pattern 101 printed thereon to represent a corresponding encoded data 102 which is coded according to a specific coding method; and the instruction pattern 101 can be a figure, a bar code, a text, a number, a symbol, and/or a plurality of points, and the instruction pattern 101 comprises at least one general instruction 101A or at least one system instruction 101B; an optical reading device 11 used to read the encoded data 102 on the instruction pattern 101; and a programming processing device 12 coupled with the optical reading device 11; wherein the programming processing device 12 comprises a receiving unit 120, a program code database unit 121, a processing unit 122, a main program register unit 123, a function register unit 124, and a program code output unit 125; wherein a code (not shown in the figure) corresponding to at least one encoded data 102, such as the "Move Forward 1" (moving forwards one step), "Move Backward 1" (moving backwards one step), "Turn Left", "Turn Right", "Red Light On", "Red Light Off", "Green Light On", "Green Light Off", etc. is stored in the program code database unit 121.

Figure 2:
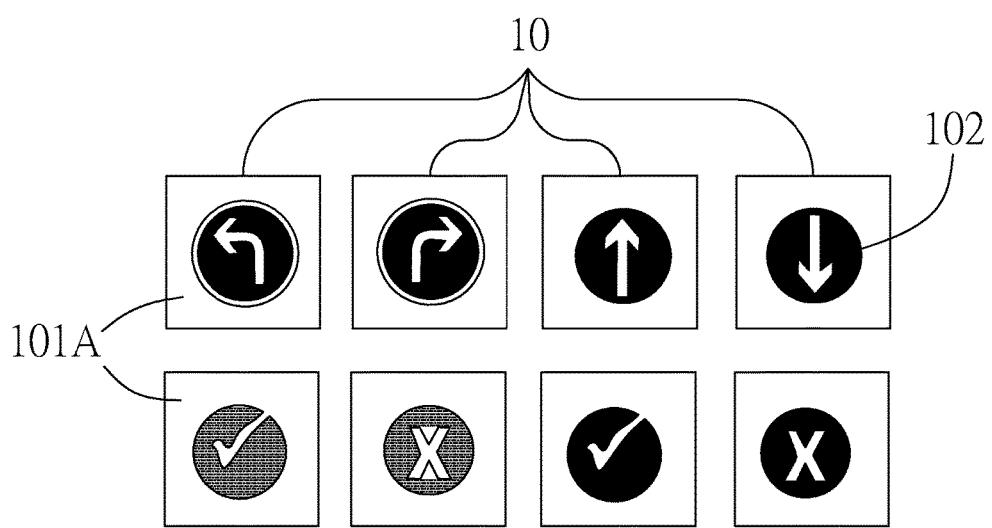
FIG. 2 is a schematic diagram of the instruction printed matter of the general instruction according to one embodiment of the present invention.

Please refer to FIG. 2, which one embodiment according to the present invention is as shown. A general instruction 101A is printed on an instruction printed matter 10 and an instruction pattern 101 is printed on each card to represent a general instruction 101A. For example, the four instructions in the upper row include: turning to the left, turning to the right, moving forwards one step, and moving backwards one step; and the encoded data 102 corresponding to the general instruction 101A is printed below the instruction pattern 101. When the optical reading device 11 clicks on the instruction pattern 101, the encoded data 102 below will be read.

Figure 3:
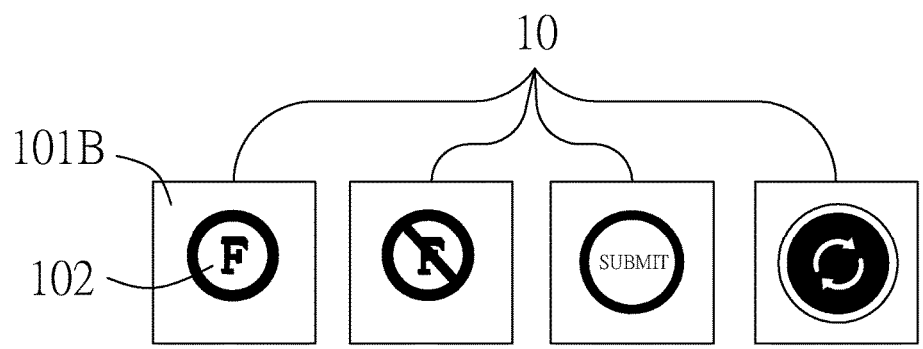
FIG. 3 is a schematic diagram of the instruction printed matter of the system instruction according to one embodiment of the present invention.

Please refer to FIG. 3, which one embodiment according to the present invention is as shown. A system instruction 101B is printed on an instruction printed matter 10 and an instruction pattern 101 is printed on each card to represent a general instruction 101A. For example, these four system instructions include: "function start", "function end", "startup", "reset", and the like.

Figure 4:
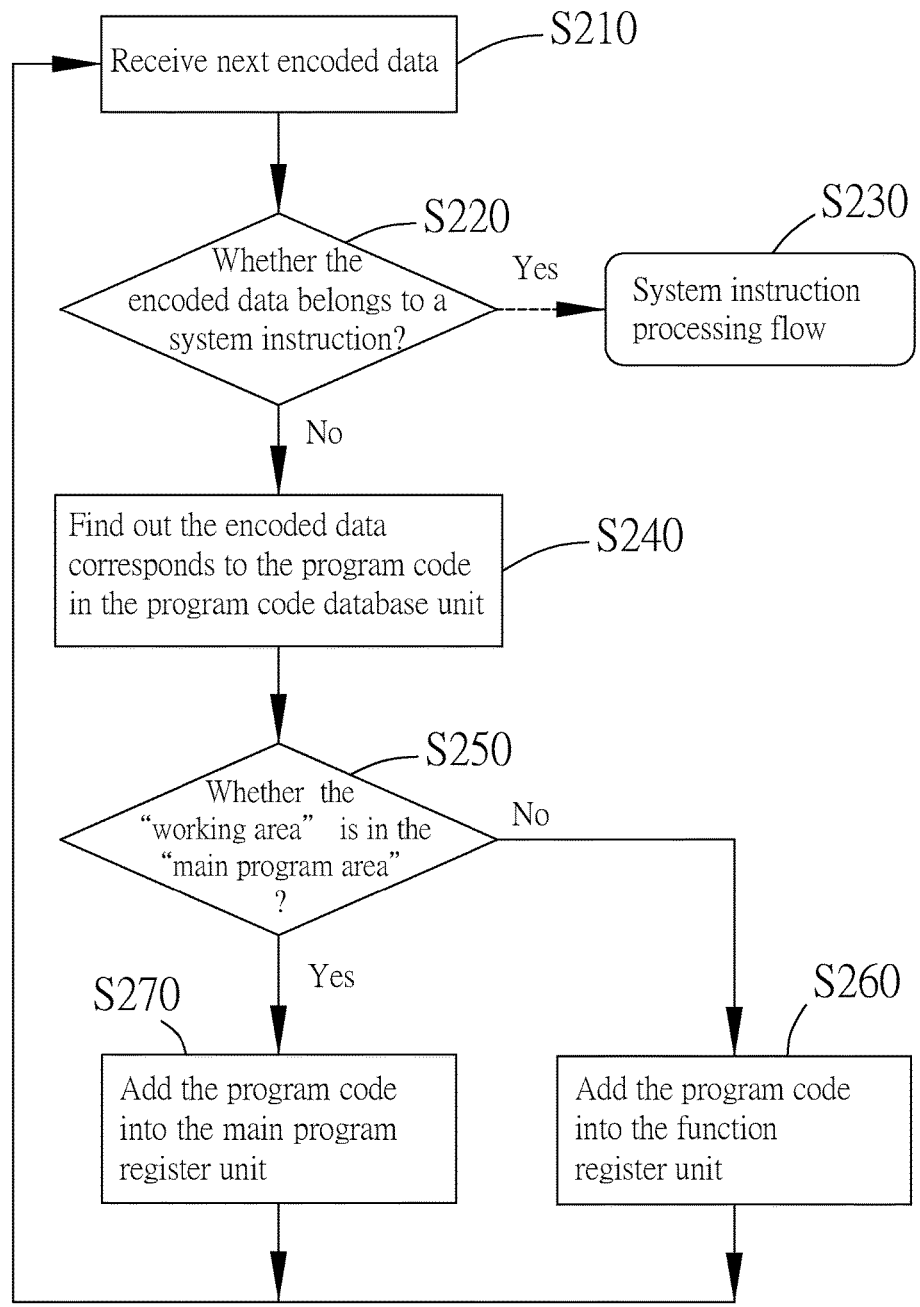
FIG. 4 is a flow chart of the programming process system according to one embodiment of the present invention.

Please refer to FIG. 1, FIG. 4, and FIG. 6; firstly in the step S210, the receiving unit 120 receives an encoded data 102 which is read from the instruction printed matter 10 by the optical reading device 11; wherein the instruction printed matter 10 has the encoded data 102 similar to FIG. 2 and FIG. 3; then, in the step S220, the receiving unit 120 will hand over the received encoded data 102 to the processing unit 122 for processing; the system instruction is entered to execute the step S230 if the encoded data 102 belongs to the system instruction 101B, and the step S240 is executed if the encoded data 102 belongs to the general instruction 101A; wherein in a general practical operation, the encoded data 102 can use the first bit in the left side to distinguish whether it is the general instruction 101A or the system instruction 101B; for example, the first bit in the left side of the encoded data "0000000000001" is "0", so it is a general instruction 101A, and encoded data of the encoded data "1000000000001" is "1", so it is a system instruction 101B; then, in the step S240, the processing unit 122 searches the program code database unit 121 for the content of the program code corresponding to the encoded data 102 when it processes the general instruction 101A; then, in the step S250, the processing unit 122 determines whether the program code searched in step S240 is to be saved in the main program register unit 123 or the function register unit 124 according to the contents of the current "working area" variable; wherein the switch of the "working area" variable content is determined by the system instruction 101B.

Figure 5:
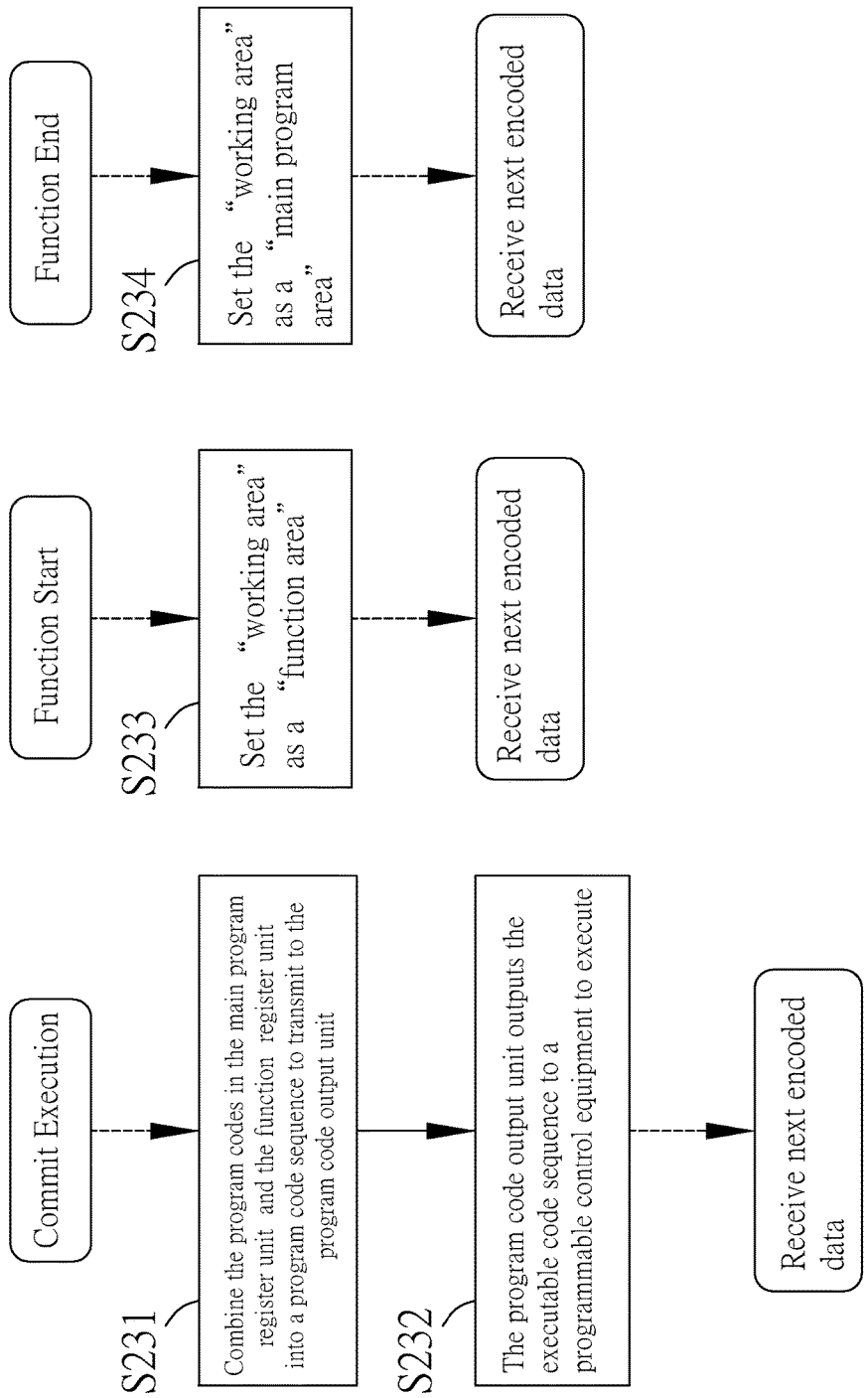
FIG. 5 is a flow chart of the system instruction processing according to one embodiment of the present invention.

Please refer to FIG. 1 and FIG. 5; the step S231 as shown is the processing mode of the processing unit 122 when the "startup" instruction is executed; for example, if the encoded data "1000000000001" is a "startup" instruction, the system will combine the program codes in the main program register unit 123 and the function register unit 124 into a program code sequence; wherein the combination way of the program code will be combined according to the actual requirements of the programmable control equipment 13; for example, if the programmable control equipment 13 is a robot, the system will put the startup parameter code of the robot at the most front position of the main program register unit 123; then, the program code of the function register unit 124 is combined; finally in the step S232, the combined program code sequence is transmitted to the programmable control equipment 13 via the program code output unit 125 for manipulation; wherein the data transmission between the program code output unit 125 and the programmable control equipment 13 can be wireless or wired; for example, in the step S233, when the processing unit 122 processes the "function start" instruction, the content of the "working area" variable is set as the "function area", which represents that the corresponding program codes subsequently searched through the program code database unit 121 will be saved to the function register unit 124; for example, in the step S234, the content of the "working area" variable is set as the "main program area", which represents that the corresponding program codes subsequently searched through the program code database unit 121 will be saved to the main program register unit 123; wherein the initial value or default value of the "working area" variable is the "main program area" when the system is restarted or reset.

Please refer to FIG. 6, which demonstrates an example of a combined program codes sequence according to one embodiment of the present invention. The example is a program code sequence combined through step S231, wherein the first line is the parameter setting to start a robot, the third line is moving forwards one step, the fourth line is also moving forwards one step, and the fifth line is a calling function; wherein the definition of the function is in lines 15-18 to put the commonly used functions together. In this example, rings two horns, then the robot turns left, moves forwards two steps, rings two horns again, turn right, moves forwards two steps again, turn right again, and then ends.

To sum up, the programmable control system 1 applying the optical reading device according to the present invention can perform the programming of the program code through reading the order of the encoded data 102 on the instruction printed matter 10; and the program code sequence is transmitted to the programmable control equipment 13 after the program codes are programmed to achieve the purpose of manipulating a device or an equipment.

The system, specific types or portions of the present invention thereof can be implemented by a type of program codes in a physical medium such as a floppy disk, optical disk, hard disk, or any other machine readable storage media, e.g., a computer readable; wherein a machine, such as a computer, becomes a device or system for participating in the present invention when the program codes are loaded and executed by the machine.

When being implemented in a general-purpose processor for the practical use, the program codes can combine with the processor to provide a unique device that operates similar to applying the specific logic circuits; which the unique device can also be built into a controlled equipment.

I claim:

1. A programmable control system of an optical reading device, which comprises:

an instruction printed matter which has at least one instruction pattern thereon, wherein a corresponding encoded data is printed on the instruction pattern;

an optical reading device used to read the encoded data on the instruction pattern; and a programming processing device which is coupled with the optical reading device and has a program code database unit saving at least one program code;

wherein the program code is corresponded to an encoded data on the instruction pattern; and the programming processing device reads at least one encoded data of the instruction patterns via the optical reading device and stores the program code content corresponding to the encoded data in the reading order into a main program register unit or a function register unit;

wherein the programming processing device will combine the sequenced program codes in the main program register unit and the function register unit into a program code sequence after the optical reading device has read an instruction of startup, and the program code sequence will be transmitted to a programmable control equipment through a program code output unit to proceed the manipulation.

2. The programmable control system according to claim 1, wherein the instruction pattern comprises at least one general instruction or at least one system instruction, the general instruction can control the equipment actions, such as moving forwards one step, turning left, turning right, the red light is on, etc.; and the system instruction executes the system-related settings such as "function start", "function end", "reset", "startup", and so on.

3. The programmable control system according to claim 1, wherein the optical reading device has a startup button, a startup instruction can be directly input to the optical reading device when the user presses the startup button.

4. The programmable control system according to claim 1, wherein the encoded data can be transmitted to the programming processing device to process after the optical reading device reads the encoded data on the instruction pattern of the instruction printed matter by using the wired or wireless connection such as the wireless radio communication, RF radio, Bluetooth, Wifi, Wimax, UWB, etc.

5. The programmable control system according to claim 1, wherein the programming processing device comprises a processing unit, and the processing unit will store the program code in the program code database corresponding to the encoded data into the main program register unit or the function register unit if the encoded data belongs to a general instruction after the programming processing device receives the encoded data sent from the optical reading device; and the processing unit will do the system-related setting or processing if the encoded data belongs to a system instruction.

* * * * *